3,826,673
COATING PROCESS

Robert E. Batson, Newington, and Andrew G. Bachmann, Weatogue, Conn., assignors to Loctite Corporation, Newington, Conn.
No Drawing. Filed Feb. 14, 1972, Ser. No. 226,313
Int. Cl. B44d 1/44
U.S. Cl. 117—62.2   15 Claims

ABSTRACT OF THE DISCLOSURE

A process is presented for applying coatings to cylindrical objects, such as threaded fasteners, which involves a post-coating treatment with a congealing agent to increase the resistance of the coating to abrasion and damage during the period following the coating steps, but before the coating composition has dried to a significant extent.

BACKGROUND OF THE INVENTION

This invention concerns the application of dryable liquid coatings to cylindrical objects, and finds its prime utility in the application of such coatings to threaded fasteners, such as studs, bolts, wood screws, etc. Other typical applications are the application of such coatings to threaded pipe connections, as well as to non-threaded objects, such as rivets.

As used herein, the term "cylinder" or "cylindrical" refers not only to the commonly encountered straight or tapered cylindrical objects, but also to other objects of a generally cylindrical orientation formed about an axis of revolution. For the most part, the invention will hereafter be described in terms of straight or tapered cylinders, and most commonly with regard to threaded fasteners.

The application of coating compositions, such as adhesive or sealant coatings, high viscosity or solid lubricants, protective coatings, etc., to objects such as threaded fasteners can greatly expand the scope of utility of such objects. Of particular interest is the application of curable adhesive or sealant coatings, as is disclosed for example in U.S. Pat. 3,489,599 to Krieble, issued Jan. 13, 1970, and U.S. Pat. 3,485,132 to Hanny et al., issued Dec. 23, 1969. Of particular interest is the patent to Krieble as it concerns polymerizable anaerobic compositions, which are adhesives and sealants composed of mixtures of acrylate esters and peroxy polymerization initiators. Anaerobic compositions are so-named because they remain in the uncured liquid state as long as exposure to oxygen is maintained. When placed in the absence of oxygen (such as between the threads of mating nuts and bolts), oxygen is excluded and the initiator will cause the acrylate ester to polymerize (cure). This unique property makes the compositions particularly adaptable to use as adhesives and sealants on threaded objects, such as threaded fasteners.

Unfortunately, the high speed application of coating compositions to threaded objects such as fasteners has been extremely difficult. These coatings conventionally must be applied in a liquid or pastelike form so that the coating material can be brought into intimate contact with the surface to be coated. The coating also must possess the ability to be retained on the surface, and hence it is necessary for the material to dry subsequent to application to a more durable state, to prevent removal by abrasion or normal liquid flow.

The normal application technique involves applying the coating material as a solution or dispersion in a volatile solvent and then, by means of heated or room temperature drying cycles, allow the solvent to evaporate to leave the coating deposited on the cylindrical object. This has presented substantial problems in view of the extremely large number of parts that must be handled in a given time period in order to make the process economically feasible. Problems also have been presented by the fact that adhesive and sealant compositions almost without exception are organic in nature, and hence organic solvents generally are used in the coating compositions. This presents handling problems in terms of hazards, toxicity, noxious vapors, corrosivity, etc. While some of these problems can be avoided by the use of a solvent of reduced volatility, this greatly extends the drying time and commensurately increases the parts handling problems.

A process for applying coating compositions to cylindrical objects such as threaded fasteners which eliminates or greatly reduces the parts handling problems would be a novel and useful process, and would be of substantial importance in the art.

THE INVENTION

This invention concerns a process for coating cylindrical objects which involves the use of a flowable or spreadable coating composition which contains a first reactant as a portion of its composition and the contacting of the coating composition subsequent to its application to the cylindrical object with a congealing agent containing or consisting of a second reactant which reacts with the first reactant to congeal at least the surface of the coating composition.

In this manner, a much more durable coating composition is prepared which thereafter possesses substantially increased resistance to abrasion and normal liquid flow from the surface of the coated cylinder. The coating is more firmly retained on the cylindrical part, and the remainder of the coating can be allowed to proceed to dry in the conventional manner at room temperature, or by the use of heating equipment. It has been found that during normal handling and transportation of the coated objects during subsequent processing operations, little if any damage is done to the coating. The final product possesses greatly improved appearance and, since the coating is not damaged or removed, possesses greater uniformity and utility in performing its intended function.

The invention also concerns a process for applying coatings to a series of advancing cylindrical objects which comprises preparation of a spreadable coating composition containing a polymer having a multiplicity of reactive sites, passing the advancing objects through a coating station wherein the coating composition is applied to at least a portion of the surface of said objects, and thereafter contacting the coated portion of the object with a congealing agent consisting of, or containing, a compound which will react with the reactive sites of the above polymer to form a surface of increased durability, i.e., increased resistance to flow of the coating and increased resistance to loss of coating by abrasion.

DISCUSSION OF THE INVENTION AND ITS PREFERRED EMBODIMENTS

The coating compositions discussed herein are of liquid or paste consistency, and either flow under their own weight or can be easily pumped or spread by moderate pressure. Such compositions can be handled by gravity flow, standard pumping equipment, and other conventional processing equipment and techniques. They are sometimes referred to herein as "flowable coating compositions" to distinguish them from dry or solid materials.

This does not mean that the coating compositions cannot contain solid particles, as in a highly preferred embodiment of this invention the composition can contain such solid particles, most preferably microencapsulated adhesives or sealants. Microencapsulated adhesives or sealants are liquid or flowable adhesive or sealant compositions, or reactants therefor, such as an encapsulated epoxy and hardener therefor, which are contained within small or even microscopic solid particles. These particles commonly range from about 50 microns or smaller up to about 2000 microns or larger in particle size. They can be prepared by techniques known in the art, such as are described in the Krieble or Hanny et al. patents, above. Most preferably, the coating composition contains microencapsulated anaerobic adhesive or sealant compositions.

The coating composition also can contain such materials as plasticizers, binding agents to increase the quality of the coating, coloring materials for appearance purposes, and any of a large number of other additives which will be readily apparent to the skilled worker in the art. The coating also contains a solvent of some type as discussed above, in order to render the composition flowable or spreadable.

The coating compositions can be of a pumpable, paste-like substance, but preferably are a liquid at normal temperature and pressure conditions. The liquid can be a low viscosity liquid, with a viscosity as low as about 10 centipoise. Preferably the viscosity is not lower than about 200 centipoise, and most preferably 500 centipoise. At the upper limit, the determination is basically one of convenience, in view of the available liquid handling equipment. As a general rule, the liquid should not be above about 200,000 centipoise, preferably not above 100,000, and most preferably not above about 75,000 centipoise. The composition can be a true solution, or can contain dispersed liquid droplets or solid particles instead of, or in addition to the dissolved components. Thixotropic agents can be added to provide a desirable balance between static and dynamic viscosities.

The coating composition contains a first reactant for subsequently participating in the congealing operation. This ingredient can also serve an adhesive or other useful function in the coating composition, or be added merely for its ability to serve as a reactant in the congealing operation.

The second reactant, herein referred to as the congealing agent, is applied to the surface of the coating composition subsequent to its application to the cylindrical object. It is to be understood that the congealing agent can be applied in pure form if appropriate, but preferably is applied as a solution in a volatile solvent, typically at a concentration of from about 0.1% to about 20% by weight of the solution, and preferably from about 1% to about 5% by weight. In this manner, excessive reactant is not used and more intimate contact with the first reactant at the surface of the coating composition is achieved.

The first reactant must be capable of rapid reaction with a second reactant to form a film or other barrier on the outer surface of the coating upon contact with the second reactant. A simple routine test will easily demonstrate the suitability of any pair of reactants for this purpose.

In selecting these reactants it is important to remember that a rapid reaction at the surface of the coating is important, and hence the reaction must be chosen so that perceptible congealing or rigidifying of the surface is achieved within a short period of time, such as one minute, and preferably within 30 seconds, and most preferably 15 seconds. Perceptible congealing can be determined by lightly rubbing a finger across the composition treated with the congealing agent and observing when substantial increase in resistance to removal of the coating composition is observed.

A particularly desirable class of compounds for use as one of the reactants in this process are thermoplastic polymers containing a multiplicity of active hydrogen atoms thereon. By "active hydrogen atoms," reference is made to the well-known usage of such term in the art, i.e., a hydrogen atom of sufficiently polar character so as to readily participate in hydrogen bonding and/or be readily removed in substitution reactions. Most commonly, the active hydrogen is a hydrogen atom bonded to an oxygen, sulfur or nitrogen atom, although in certain cases it can be bonded to a carbon atom in a position alpha to a highly electronegative atom. The most highly preferred of these polymers is polyvinylalcohol, although it has been found that many polyvinylacetals and polyvinylesters, such as polyvinylbutyral, polyvinylformal and polyvinylacetate, are also quite acceptable—possibly due to the partial hydrolysis of the normal pendant groups. Another example of useful polymers is the class of polyamides.

When polymers as described in the preceding paragraph are used, they preferably are incorporated in the coating composition, to serve as the "first reactant" as described above.

When the above described polymers are used as one of the reactants, a large number of suitable co-reactants are available, a definition of a number of these being present below. Preferably these materials are used as the "second reactant" as defined above. With all of the co-reactants to be discussed hereafter, perceptible congealing is achieved almost instantaneously, and in all cases is achieved in less than 15 seconds. Suitable classes of co-reactants for the above described polymers are as follows:

(1) In organic polyfunctional acids capable of reacting with the active hydrogens of the above described polymers.—Examples are borax and silacic acid.

(2) Hydrogen bonding compounds.—Typical examples are cotton-fast dyes, such as Congo red; polyhydroxy aromatic compounds, such as resorcinol; salicyl analides; and phenol acids, such as gallic acid and dihydroxy benzoic acid.

(3) Cross linking agents, such as aldehydes or methylolated amides.

(4) Metal hydroxides, such as copper hydroxides; titanium hydroxides; tin hydroxides; or precursors for any of the foregoing, such as cuprous chloride, or tetraisopropyl-titanium.

(5) Strongly chelating salts of transition metals, such as cupric ammonium chloride.

Other compounds capable of reacting rapidly with active hydrogen atoms on the above described polymer will be well known to the reasonably skilled worker in the art, and are considered to be within the broad scope of this invention.

The cylindrical objects to be coated as described herein can be processed singly, as by hand dipping of the object in the coating composition, and thereafter contacting same with the congealing agent. Commonly, however, and in the preferred aspect of this invention, a large number of cylindrical objects are processed serially by automated or semiautomated equipment. An example of such equipment is described in the co-pending application of Batson, Haviland and Matchett, Ser. No. 226,130, filed Sept. 14, 1972.

In the preferred embodiment of this process, a series of cylindrical objects are advanced through a coating station having a coating head for applying coating composition. The coating head may be a coating block having the coating composition delivered to the face thereof, a rotating coating device such as a coating transfer wheel or a rotating fibre mat, a transfer or spray nozzle, or any other device well known in the art. It is preferable that the coating be applied to a predetermined, localized area on the cylindrical surface.

To achieve a uniform coating around the cylindrical member, as is highly desirable, the cylindrical member preferably is rotated in contact with the coating head so as to provide a coating around the cylindrical surface. Thereafter, the coating composition is contacted with the congealing agent. While dipping or other convenient operations could be used, it has been found desirable to apply the congealing agent by spraying onto the coated surface. Proper control of the spray pattern will produce intimate contact without applying an excessive amount of congealing agent to the coated surface.

Thereafter, the coated objects can be handled by conventional parts-handling equipment such as conveyors; but, preferably, they are subjected to an induction, hot air, or other comparable drying operation to speed the drying of the coating.

In another preferred aspect of this invention both the coating composition and the congealing agent utilize water as their solvent. In this manner, inexpensive coating operations are obtained which are free from the numerous problems which are associated with the use of organic solvents. A sizable number of polymers having pendant active hydrogen atoms are soluble in water and can be successfully used therewith. Essentially all of the congealing agents disclosed above can be successfully used with polyvinylalcohol, but the preferred ones are borax, Congo red and metal hydroxides. A typical coating composition which can be applied by the process described herein is one which contains from about 1% to about 20% by weight polymer, such as polyvinylalcohol; from about 15% to about 75% by weight microencapsulated adhesive or sealant; from about 20% to about 80% by weight water; if desired, appropriate amounts of dyes, viscosity regulating agents, etc., can be added.

EXAMPLES

The following examples are given to demonstrate the materials and operations of the process of invention disclosed herein, and are not intended to be limitations upon the scope of the invention. Unless specifically stated to the contrary herein, all ratios and percentages are expressed on a weight basis.

Example I

A standard adhesive coating composition was prepared by mixing the following ingredients in the approximate ratios indicated:

| | Parts by weight |
|---|---|
| Water | 94 |
| Polyvinylalcohol | 6 |
| Encapsulated adhesive | 50 |
| Coloring agent (aluminum powder) | 2.5 |
| Lubricant (graphite) | 0.25 |

A series of standard 3/8"-16 bolts were coated with the above described standard adhesive composition. Application was by placing a small amount of coating composition on an appropriate area of the threaded portion of the fastener, followed by rotating the bolt in contact with a wet Teflon surface. Sufficient coating composition was applied in this manner to provide a uniform band around the circumference of the bolt approximately ½ inch in width. Following coating, coated bolts were dipped into one of the three congealing agent solutions, and immediately removed and observed. In each instance, substantial congealing or firming of the surface of the coating composition was observed almost instantaneously; in all cases, substantial congealing was present within 5 seconds after the dipping operation. This was observed by noticing an increase of resistance to removal by rubbing with the finger, and by the substantial decline in the tackiness of the coating surface as compared to the coating prior to dipping in the congealing agent. The congealing agents which were used were as follows:

(1) Borax—2% by weight in water
(2) Congo red—5% by weight in water
(3) Salicyl anilide—5% by weight in water Example II The procedure of Example I was repeated in substantially identical form, except that approximately 1.5% by weight ferric chloride was added to the coating composition prior to application to the bolts. The coating composition thereafter was applied as described in Example I, and immediately thereafter the coated bolts were dipped into a 1% by weight aqueous solution of ammonium hydroxide. The ammonium hydroxide and ferric chloride reacted to form ferric hydroxide, which in turn reacted with the polyvinylalcohol to form a congealed surface on the coating composition. The results were substantially the same as those described in Example I, in that essentially immediate loss of surface tackiness and increase of abrasion resistance was noted in the coating composition.

The procedure of this Example was repeated, using 1% by weight aqueous solution of sodium hydroxide and 1% by weight aqueous solution of sodium bicarbonate as congealing agents. Substantially similar results were obtained in each case.

Example III

A series of 3/8"-16 bolts were fed along a horizontal conveyor and rotated across a coating block which had the adhesive coating composition of Example I applied to the face thereof. In this manner, a uniform band approximately ½ inch in width was applied uniformly around the circumference of the bolt. As the bolts continued down the horizontal conveyor, they were passed in front of a mist sprayer of 2% by weight borax in water. The entire circumference of the bolt was contacted relatively uniformly with the borax spray. A near instantaneous increase in resistance to abrasion and decrease in tackiness was noted on the surface of the bolts, and in less than 5 seconds it was found that the bolts could be subjected to normal contact with a discharge chute and a conveyor without substantial adverse effect upon the appearance or quality of the coating.

What is claimed is:

1. A process for coating cylindrical fasteners which comprises:
    (a) preparing a spreadable aqueous coating composition containing a first reactant which is a thermoplastic polymer containing a multiplicity of active hydrogen atoms thereon;
    (b) applying said coating composition to at least a portion of the surface of said cylindrical fasteners; and
    (c) thereafter contacting the portion of the surface containing said coating composition with an aqueous congealing agent, said congealing agent containing a second reactant for reaction with said first reactant to congeal within about one minute at least the surface of the coating composition, and increase the durability thereof, said second reactant being selected from the class consisting of: inorganic polyfunctional acids; hydrogen bonding compounds; aldehydes; methylolated amides; metal hydroxides; and chelating salts of transition metals.

2. The process of Claim 1 wherein substantial congealing of the surface of the coating composition is accomplished within about 15 seconds.

3. The process of Claim 1 wherein the coating composition has a viscosity between about 200 and about 100,000 centipoise.

4. The process of Claim 3 wherein the coating composition contains a microencapsulated adhesive or sealant.

5. The process of Claim 1 wherein the thermoplastic polymer is selected from the class consisting of polyvinylalcohol, polyvinylacetals, polyvinylesters and polyamides.

6. The process of Claim 5 wherein the thermoplastic polymer is polyvinylalcohol.

7. The process of Claim 6 wherein the second reactant is borax.

8. A process for applying an aqueous coating to a series of advancing cylindrical fasteners which comprises:
    (a) preparing a spreadable aqueous coating composition containing a thermoplastic polymer having a multiplicity of active hydrogen atoms thereon;
    (b) passing said advancing cylindrical fasteners past a coating station wherein said coating composition is applied to at least a portion of the surface of each cylindrical fastener; and (c) thereafter contacting the portion of the surface containing said coating composition with an aqueous congealing agent containing a compound which reacts with the active hydrogen atoms of said polymer to congeal at least the surface of said coating composition, and increase the durability thereof.

9. The process of Claim 8 wherein the coating composition has a viscosity between about 200 and about 100,000 centipoise.

10. The process of Claim 8 wherein the thermoplastic polymer is selected from the class consisting of polyvinylalcohol, polyvinylacetals, polyvinylesters and polyamides.

11. The process of Claim 10 wherein the second reactant is selected from the class consisting of: inorganic polyfunctional acids; hydrogen bonding compounds; aldehydes; methylolated amides; metal hydroxides; and chelating salts of transition metals.

12. The process of Claim 8 wherein the coating composition contains a microencapsulated adhesive or sealant.

13. The process of Claim 12 wherein the microencapsulated adhesive or sealant is an anaerobic adhesive or sealant.

14. The process of Claim 12 wherein the thermoplastic polymer is polyvinyl alcohol.

15. The process of Claim 14 wherein the congealing agent contains borax.

References Cited

UNITED STATES PATENTS

| | | | |
|---|---|---|---|
| 3,639,137 | 2/1972 | Marinelli | 117—75 |
| 3,318,727 | 5/1967 | Boenig et al. | 117—94 |
| 3,514,316 | 5/1970 | Kemp et al. | 117—94 |
| 3,179,143 | 4/1965 | Schultz et al. | 117—62.2 |
| 3,411,940 | 11/1968 | Lopez et al. | 117—62.2 |
| 3,506,526 | 4/1970 | Toyooka | 117—62.2 |
| 3,632,391 | 1/1972 | Whitfield | 117—62.2 |

WILLIAM D. MARTIN, Primary Examiner

J. A. BELL, Assistant Examiner

U.S. Cl. X.R.

117—72, 94, 132 R

UNITED STATES PATENT OFFICE
CERTIFICATE OF CORRECTION

Patent No. 3,826,673          Dated July 30, 1974

Inventor(s) Robert E. Batson and Andrew G. Bachmann

It is certified that error appears in the above-identified patent and that said Letters Patent are hereby corrected as shown below:

Column 4, line 54:  Delete "Sept." and substitute --Feb.--.

Signed and sealed this 11th day of February 1975.

(SEAL)
Attest:

RUTH C. MASON
Attesting Officer

C. MARSHALL DANN
Commissioner of Patents
and Trademarks